UNITED STATES PATENT OFFICE.

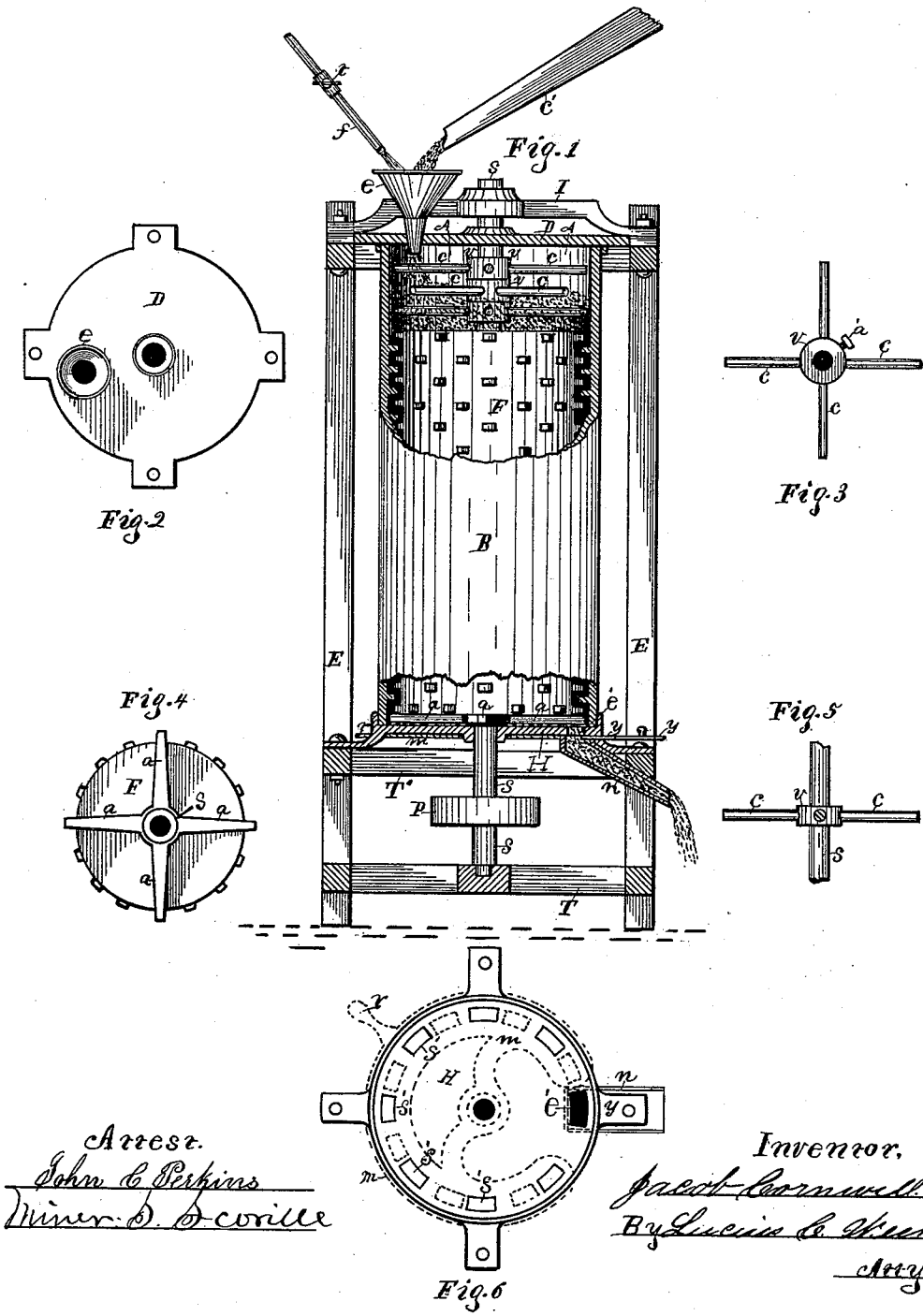

JACOB CORNWELL, OF CADILLAC, MICHIGAN.

GRAIN-DECORTICATING MACHINE.

SPECIFICATION forming part of Letters Patent No. 262,648, dated August 15, 1882.

Application filed February 18, 1882. (No model.)

*To all whom it may concern:*

Be it known that I, JACOB CORNWELL, a citizen of the United States, residing at Cadillac, county of Wexford, State of Michigan, have invented a new and useful Grain-Decorticating Machine, of which the following is a specification.

My invention relates to a decorticating-machine patented to me in the United States, March 8, 1881, reissued December 6, 1881. Said machine consisted of a cylinder and cylinder-case provided with teeth for removing the testa from grain. Said case was provided with a chamber above the cylinder, into which was deposited the grain after having been prepared in an auxiliary cylinder in condition for decorticating, where any undue accumulation of said grain acted upon a disk and lever device automatically controlling its supply. I find by experimenting that all the cumbersome gearing and mechanism located above the cylinder, in the chamber and out of it, except the cylinder-shaft and arms or sweeps in said chamber, are superfluous and unnecessary in effecting the result desired.

The object of my present invention is to so improve and simplify my former device that the auxiliary cylinder and accompaniments may be dispensed with, and that all the preparation of the grain in condition for being acted upon by the teeth of the machine may be accomplished in the cylinder-case chamber direct.

In the accompanying drawings, forming a part of this specification, Figure 1 is an elevation with portions broken away, showing internal construction; Fig. 2, a top view of the cylinder-case cover; Fig. 3, a detached section of the sweeps in the cylinder-case chamber; Fig. 4, a bottom view of the cylinder; Fig. 5, a side view of Fig. 3; and Fig. 6 is a top view of plate which supports the cylinder-case.

F is the revoluble perpendicularly-located cylinder, and B the cylinder-case, both provided with teeth, substantially like said parts in my former device. The cylinder-shaft S has its bearing in bars I and T of the supporting-frame E E.

In lieu of the shafts and gearing in my prior machine, I simply employ a single band-wheel, P, with which a belt connects from the driving mechanism.

A A is the case-chamber, occupying the space between cover D and the top of cylinder F.

For a correct understanding of the process of treating the wheat by my old device reference should be had to the patents cited above, in contrast with which my present improvements will appear in their true light.

The preparation of the wheat prior to the action of the teeth upon it consists in thoroughly moistening it. I effect this in the case-chamber direct by eliminating therefrom the former disk, tube, lever, and spout, and providing it with multiple series of arms and with a cover, D, having a funnel, $e$, or funnel-orifice leading into said case-chamber, Figs. 1 and 2. In immediate relationship with the funnel I locate a spout, $c'$, connecting with an elevated grain-bin, and a tube, $f$, connecting with an elevated tank or water-supply, and so adapt and arrange all the parts that the water and grain are delivered commingling into the chamber, where they are thoroughly agitated by the multiple tiers of arms $c$ $c$, causing the grain to become more uniformly moistened and with less liability of becoming unduly moistened than with my former arrangement, said arms also imparting whatever beneficial results were attained by the arms in my old device, tending to loosen the testa and to sweep the grain outward in position to fall between the cylinder and case among the teeth. The grain and the removed testa or hull pass from the machine through orifice $e'$ and spout $n$. This spout in the operation connects with an air-trunk of a device which separates the testa from the grain.

I form the arms in chamber A A in my present device in detachable sections, consisting of hub $v$ and diverging arms $c$ $c$, by which means I am enabled to locate as few or many in the chamber as are needed. This arrangement would be especially desirable in case the cylinder and cylinder-case were put up in sections, which is sometimes the case.

I form the arms $a$ $a$ tapering from shaft S to their ends, which extend beyond the cylinder. I also form them integral with said cylinder or firmly secured thereto, as in Fig. 4. These arms, sweeping around as the cylinder revolves, carry the accumulations in the lower chamber to orifice $e'$.

In Fig. 6, $S'$ $S'$ are perforations through the bottom plate, H, which supports case B. Beneath this plate is located plate m, pivoted to shaft S and provided with like perforations, (shown in this figure in dotted lines.) r is a handle for revolving plate m when opening and closing the perforations S' S'. The object of this construction is to relieve the cylinder should it become clogged by the swelling of the grain or other cause during a temporary rest of the machine, or in case of a breakdown.

Having thus described my improved machine, what I desire to secure is—

1. In a machine for removing testa from grain, the combination, with a toothed cylinder-case and cylinder, a case-chamber, and agitating arms or sweeps above the cylinder, of means for delivering grain and water commingling into said case-chamber, all substantially as set forth.

2. In a machine for removing testa from grain, a cylinder-case and cylinder having teeth, a case-chamber above said cylinder, and means for stirring the grain therein, in combination with means for delivering grain and water into said case-chamber to effect the objects stated, all substantially as specified.

3. In a decorticating-machine, the combination, with a toothed cylinder-case and cylinder and the upper case-chamber, of a cover having a funnel-orifice and spouts adapted to deliver grain and water from separate sources through the orifice of said cover, all substantially as specified and shown.

4. In a decorticating-machine, a toothed cylinder and cylinder-case, the upper case-chamber, and means for agitating the grain therein, in combination with a cylinder-case cover having an orifice and spouts adapted to deliver grain and water through said orifice, all substantially as set forth.

JACOB CORNWELL.

Witnesses:
ROBERT CHRISTENSE,
R. L. RICE.